ABSTRACT
United States Patent [19]

Lucas et al.

[11] 4,344,924
[45] Aug. 17, 1982

[54] SOLVENT EXTRACTION OF CHROMIUM AND VANADIUM

[75] Inventors: Bernard H. Lucas; Gordon M. Ritcey, both of Ottawa, Canada

[73] Assignee: Canadian Patents & Development Ltd., Ottawa, Canada

[21] Appl. No.: 177,103

[22] Filed: Aug. 11, 1980

[30] Foreign Application Priority Data

Sep. 28, 1979 [CA] Canada ............................ 337874

[51] Int. Cl.³ .................. C01G 37/00; C01G 31/00
[52] U.S. Cl. ........................................ 423/54; 423/56; 423/58; 423/63; 423/65; 423/67; 423/112; 423/127
[58] Field of Search .................... 423/54, 63, DIG. 14, 423/112; 75/101 BE

[56] References Cited

U.S. PATENT DOCUMENTS 3,856,917  12/1974  Texier et al. .......................... 423/54
4,230,677  10/1980  Kagetsu et al. ................ 75/101 BE

FOREIGN PATENT DOCUMENTS 7313348  4/1974  Netherlands .......................... 423/54

OTHER PUBLICATIONS

George et al., "Journal of Metals", Sep. 1968, pp. 59–63.
"Bulletin on Vanadium", CDS3-60, General Mills, Inc., Kankakee, Ill., 1960, pp. 1–7.
"Bulletin on Chromium", CDS1-61, General Mills, Inc., Kankakee, Ill., 1960, pp. 1–13.
Ritcey et al., "Proceedings of the International Solvent Extraction Conference", CIM Special vol. 21, 1979, pp. 520–530, vol. 2.
Weinhardt et al., "Ind. & Eng. Chem.", vol. 47, 1951, pp. 1676–1684.
Adam et al., "Talanta", vol. 18, 1971, pp. 91–95.

*Primary Examiner*—Herbert T. Carter
*Attorney, Agent, or Firm*—Alan A. Thomson

[57] ABSTRACT

Chromium and vanadium can be co-extracted from alkaline solutions or leach liquors containing these metals using quaternary amine solvent mixtures. The alkaline leach liquors usually are derived by leaching of calcined ores or concentrates. The loaded solvent mixture is scrubbed with chromium solution to remove all metals except chromium, and the chromium is then recovered from the solvent phase. The vanadium can be recovered from the scrub liquor. Recovery of aluminum is also possible.

14 Claims, 1 Drawing Figure

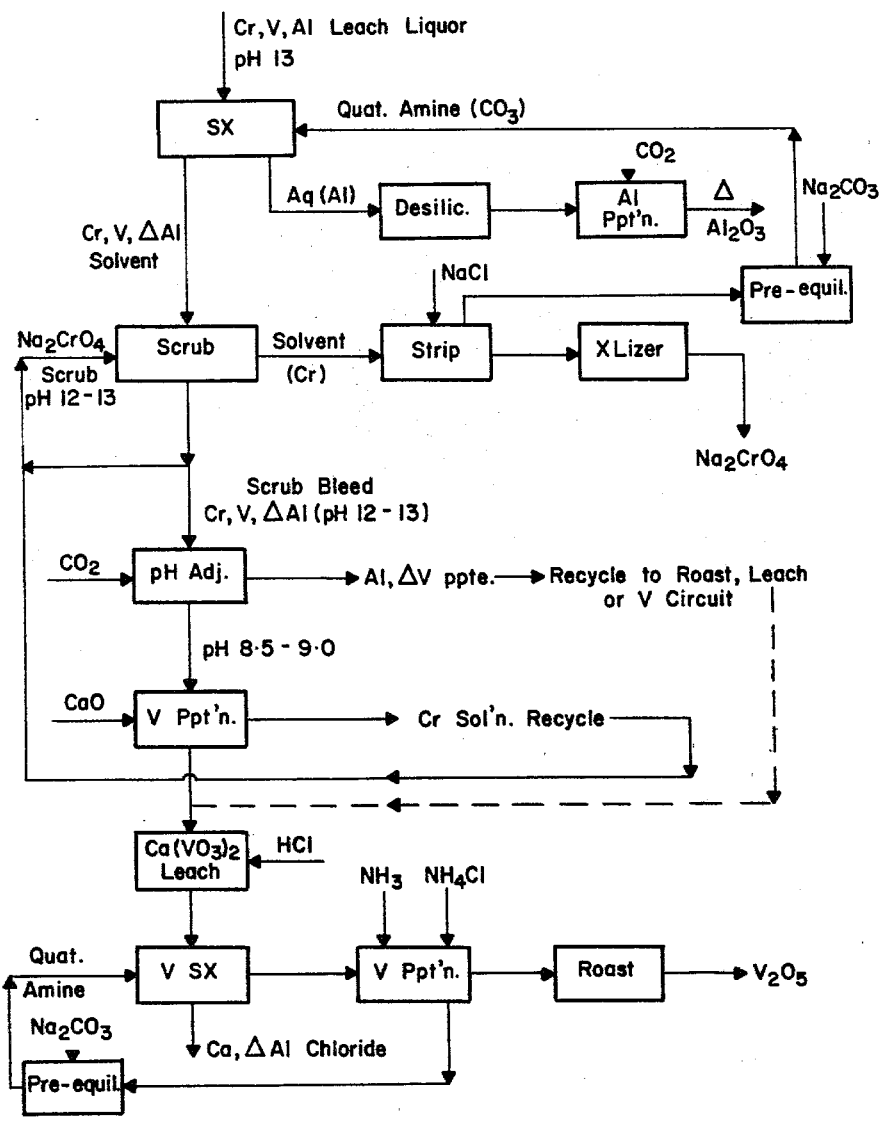

SOLVENT EXTRACTION OF CHROMIUM AND VANADIUM

This invention deals with the recovery of chromium and vanadium from alkaline solution by co-extraction from the solution or leach liquor, scrubbing of the extract phase and separate recovery of Cr from the scrubbed extract phase and V from the scrub liquor. Where present, Al may also be recovered from the solution or leach liquor and from the scrub liquor, e.g. by precipitation.

In the prior literature, there has been only a limited number of reports of solvent extraction separation of these metals. From acidic leach liquors, vanadium has been extracted at pH 1.4–3.0, at 90°–120° C., using an organophosphate (e.g. di-(2-ethylhexyl)-phosphoric acid)—see U.S. Pat. No. 3,151,933 (1964). In the pH 0–4 range, an oxime has been used to extract vanadium—see U.S. Pat. No. 3,415,616 (1968). Leach solution in the pH 5.5–7 range from a salt roast, has been contacted with a long chain amine for the extraction of vanadium. In their "Bulletin on Vanadium", CDS3-60 (1960), General Mills have shown maximum extraction (98.5%) of vanadium at pH 5.1, compared to only 25% at pH 11.3 using 0.1 M quaternary amine (Aliquat 336—trademark). Recovery of vanadium by direct precipitation from an organic phase has been reported using gaseous ammonia (U.S. Pat. No. 3,067,008; 1962) or ammonia plus ammonium chloride at pH 8 (U.S. Pat. No. 3,206,277; 1965).

The General Mills "Bulletin on Chromium" CDS1-61 (1961) reports the extraction of chromium using quaternary amine (Aliquat 336—trademark). In the presence of $V^{5+}$, preferential extraction of vanadium occurred at pH 9, but at pH 5 chromium was preferentially extracted (see above "Bulletin on Vanadium"). At pH 12, although very low loading occurred, chromium was preferentially extracted.

No solvent extraction technique including recovery of aluminum from alkaline solution has been noticed. From acidic solutions (pH 3), aluminum has been extracted by an organophosphate (DEHPA)—see Journal of Metals, pp 59–63, September 1968.

Recently, we reported on the sequential extraction and separate recovery of chromium and vanadium from one alkaline leach liquor using quaternary amine at pH 13 (Canadian Institute of Mining and Metallurgy, Special Vol. 21, pages 520–531, 1979). Seven stages of mixer settlers achieved 99.9% extraction of chromium. The amine utilized became fully loaded with the amount of chromium present. Vanadium was then similarly extracted by quaternary amine in four stages in the absence of chromium. The preliminary results given in Table 4 of this paper indicate that V co-extraction was not to be expected at high pH.

It would be desirable to simplify and improve on the extraction of Cr and V from alkaline leach liquors by reducing amount and size of equipment and by better use of a reduced volume of solvent and amine. The cost of neutralizing reagents should be avoided.

According to this invention a process is provided for the solvent extraction and recovery of chromium and vanadium from aqueous alkaline solutions or leach liquors containing said metals, comprising:

(a) contacting the aqueous solution or liquor, at a pH of about 13 to 13.5, with an immiscible quaternary amine solvent phase, sufficient amine being utilized to cause both Cr and V to be transferred to the solvent phase, (b) separating the loaded solvent phase from the solution or liquor and scrubbing the solvent with an aqueous chromium-containing solution to remove substantially all metals except Cr from the solvent, (c) recovering Cr from the amine solvent phase, and (d) recovering V from the scrub liquor.

In the drawing attached, a detailed flowsheet of one preferred version of the process is shown in which sodium chromate, vanadium pentoxide and alumina are recovered.

Alkaline solutions containing chromium, vanadium and frequently aluminum can result from the alkaline leaching of various ores, concentrates, calcines, slags, and waste liquors from such industrial operations as metal plating and dyeing. In ores in Canada, for example, chromium is found in high concentration in Manitoba and in various iron ores; vanadium is associated with some iron and uranium ores and tar sands, as well as certain oil refinery fly ash. Of particular interest in iron ores are the low grade titaniferous magnetites with average grades of 43% Fe, 6.3% Ti, 1.6% Cr, 0.2% V plus minor amounts of other constituents such as nickel. One such deposit is on the north shore of the St. Lawrence River in eastern Quebec near Mingan. It has been proposed to treat such ores by magnetic concentration, roasting the residual with sodium carbonate or other alkaline material, and the calcine leached with hot caustic solution. This caustic leach normally dissolves about 91% of the V, 84% of the Cr and 75% of the Al present. Such a leach solution would be a typical feed for the process of the present invention and would contain:

Cr in about 3 to 8 g/l;
V in about 0.3 to 1 g/l;
Al in about 7 to 20 g/l.
Other metals in trace amounts.

The alkaline leach liquor will usually contain about 3 to 5% total dissolved solids and be of pH about 10 to 14. If necessary, this pH will be adjusted to be within the range about pH 13.0 to 13.5 for the solvent extraction stage.

Various amine extractants were tried in preliminary tests and quaternary amines were found superior to primary, secondary or tertiary amines.

The amine solvent phase will comprise a quaternary amine of the general formula:

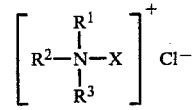

where $R^1$, $R^2$, and $R^3$ are straight or branched aliphatic chains of 8–10 carbon atoms, particularly hydrocarbons (octyl, nonyl, or capryl);

and X is lower alkyl (1–3 C) particularly methyl. The amine will have from 25 to 33 total carbon atoms in the molecule. Preferred amines are, for example, those sold under the trademarks Adogen 464 (Sherex Chemicals, formerly Ashland) and Aliquat 336 (Heinkel Chemicals, formerly General Mills). As solvent or diluent for the amine, liquid aliphatic hydrocarbons (such as kerosene, hexane, etc.) are preferred but other diluents such as aromatic or other petroleum liquids may be used. Suitable aromatic liquids include benzene, toluene, xylene, etc. Suitable solvents would be known to those skilled in the art. The amount of amine in the solvent can range from about 0.05 to 5 molar (or about 2.5 to 25% by vol.). A modifier reagent may be desirable in the solvent mixture to enhance phase separation and solubility of metalorganic species. The amount of modifier in the solvent phase can range from about 2.5-10% by volume. Examples of modifiers are isodecanol, nonylphenol and 2-ethylhexanol. Sufficient amine will be required (in excess of that needed to extract all of the Cr) to cause the co-extraction of V, so that the solvent phase becomes loaded with both Cr and V. This can be done by increasing the amine concentration in the diluent, or increasing the O/A ratio, or both. As a rough guide, we have found that each vol.% of amine loads or extracts about 0.27 g Cr+V per liter of organic phase. The minimum amount of amine required is best determined by test for the particular system.

The temperature during extraction and the later steps can vary: most suitable the temperature is within about 20° to 50° C.

The contacting of the solution or leach liquor with the solvent phase in step (a) can be carried out in any liquid-liquid batch or continuous contactors such as mixer settlers, sieve plate pulse columns, "raining bucket" contactors, and other differential contactors. The separation of the two phases may be aided by coalescing and settling devices or centrifuges. Contact times may range from about 0.5 to 5 minutes.

After separation, the loaded solvent phase is scrubbed with a chromium-containing solution to remove vanadium and aluminum. The chromium solute in the scrub solution, can be selected from any suitable soluble chromium salt, with sodium chromate being preferred. Normally this scrub solution will be at least 50% saturated in chromium and of pH 12-13. The scrub solution is recycled, with a small bleed stream taken for control of V and Al. The bleed volume is replaced with an equivalent amount of sodium chromate solution. The O/A (scrub) can vary from 1/1 to 20/1, but 10/1 has been more common in our experience.

The chromium is stripped from the organic phase by an aqueous reagent solution. Sodium chloride was found to be an effective reagent, although depending upon product specifications, other strip reagents might be more suitable, such as mineral acids. As an example of recovery from the strip liquor the Cr can be crystallized and separated as $Na_2CrO_4$. Other ways of recovering the Cr from the strip liquor include precipitation, and electroplating.

For recovery of V from the scrub solution we have found it advantageous to lower the pH to about 8.5-9, e.g. with $CO_2$, causing alumina to precipitate (a small amount of V may also precipitate). On addition of CaO, the main V precipitation will occur as $Ca(VO_3)_2$ which is separated and the residual scrub solution recycled. The vanadate precipitate may be dissolved in acid (e.g. 0.2-0.7 N HCl) and purified further by solvent extraction with the same amine solvent system. The addition of ammonia followed by ammonium chloride to the loaded solvent phase will precipitate ammonium vanadate which can be roasted to $V_2O_5$. The attached flowsheet illustrates this preferred process.

When present, aluminum can be recovered from the raffinate leach liquor since it is not significantly extracted under these conditions. For example, the raffinate can be subject to desilication, aluminum precipitation (on acidification for instance by $CO_2$) and calcination to alumina.

EXAMPLE

Co-Extraction

A titaniferous magnetite ore from the Mingan region of Quebec was ground, a magnetic concentrate removed to recover iron and titanium, and the non-magnetic fraction subject to an alkaline roast with sodium carbonate. The calcine was leached with aqueous caustic at 90° C., and the leach liquor at pH 13.2 contained 2.17 g Cr/l, 0.24 g V/l and 3.75 g Al/l. This leach liquor was contacted with a $Na_2CO_3$-equilibrated solvent mixture of 10 vol.% quaternary amine (Adogen 464—trademark), 10 vol.% isodecanol and 80 vol.% kerosene. This solvent mixture was first preequilibrated with 1 M $Na_2CO_3$ solution and then contacted with the leach liquor in 7 stages of mixer-settlers. Various organic to aqueous phase (O/A) ratios, and various flowrates (durations), were used. The results are shown in Table 1. It is evident from Table 1 that over 99% of the Cr and over 95% of the V can be co-extracted under these conditions while very little (<1%) of the Al is extracted. While there seems to be some inconsistency in the V results, the data indicates that an O/A ratio between 1.2 and 1.5 should give 99% V extraction in this system.

After phase separation, if desired, the aqueous leach liquor raffinate can proceed to a desilication stage, an aluminum precipitation, and a calcination to alumina. The barren $Na_2CO_3$-containing liquor would normally go to $Na_2CO_3$ recovery.

TABLE 1

| pH | O/A Ratio ml | ml | Run Duration hr | Cr (g/l) F or R* | Organic Calc. | Fd* | % Extr. | V (g/l) F or R | Organic Calc. | Fd | % Extr. | Al (g/l) F or R | Organic Calc. | Fd | % Extr. |
|---|---|---|---|---|---|---|---|---|---|---|---|---|---|---|---|
| 13.20 | | | | 2.17F | | | | 0.24F | | | | 3.75F | | | |
| | 110 | 90 | 4 | <.0001 | 1.77 | 1.55 | 100 | 0.004 | 0.19 | 0.18 | 98.3 | 4.61 | | 0.023 | ~1 |
| | 110 | 90 | 5 | <.0001 | 1.77 | 1.73 | 100 | 0.010 | 0.19 | 0.18 | 95.8 | 4.45 | | 0.022 | ~1 |
| | 120 | 80 | 5 | <.0001 | 1.45 | 1.43 | 100 | <.001 | 0.16 | 0.17 | 99.6 | 4.06 | | 0.033 | ~1 |
| 13.12 | 110 | 90 | 4 | <.0001 | 1.77 | 1.32 | 100 | <.0001 | 0.20 | 0.20 | 100 | 3.86 | | 0.039 | ~1 |
| 13.16 | 110 | 90 | 5 | <.0001 | 1.77 | 1.64 | 100 | <.0001 | 0.20 | 0.12 | 100 | 3.82 | | 0.024 | ~1 |
| 13.06 | 85 | 70 | 9.5 | <.0001 | 1.79 | 1.91 | 100 | 0.006 | 0.19 | 0.11 | 97.5 | 3.80 | | 0.020 | ~1 |
| 13.23 | 85 | 70 | 7.5 | <.0001 | 1.79 | 1.79 | 100 | 0.008 | 0.19 | 0.12 | 96.7 | 3.68 | 0.05 | 0.025 | 1.9 |
| 13.06 | 85 | 70 | 7.5 | <.0002 | 1.79 | 2.34 | 100 | 0.003 | 0.19 | 0.06 | 98.8 | 4.19 | | 0.018 | ~1 |
| 13.09 | 85 | 70 | 7.5 | <.0002 | 1.79 | 1.89 | 100 | 0.039 | 0.17 | 0.17 | 83.8 | 4.05 | | 0.027 | ~1 |
| 13.06 | 85 | 70 | 7.5 | <.0002 | 1.79 | 1.64 | 100 | 0.006 | 0.19 | 0.17 | 97.5 | 4.07 | | 0.027 | ~1 |
| 13.06 | 85 | 70 | 7.5 | <.0002 | 1.79 | 1.84 | 100 | 0.234 | 0.18 | 0.17 | 90.4 | 4.12 | | 0.022 | ~1 |
| 13.05 | 85 | 70 | 7.5 | <.0002 | 1.79 | 1.95 | 100 | 0.008 | 0.19 | 0.13 | 96.7 | 4.04 | | 0.023 | ~1 |

TABLE 1-continued

| | O/A Ratio | | Run Duration | Cr (g/l) | | | | V (g/l) | | | | Al (g/l) | | | |
|---|---|---|---|---|---|---|---|---|---|---|---|---|---|---|---|
| | | | | | Organic | | % | | Organic | | % | | Organic | | % |
| pH | ml | ml | hr | F or R* | Calc. | Fd* | Extr. | F or R | Calc. | Fd | Extr. | F or R | Calc. | Fd | Extr. |
| 13.05 | 85 | 70 | 7.5 | <.0002 | 1.79 | 1.63 | 100 | 0.008 | 0.19 | 0.17 | 96.7 | 4.04 | | 0.022 | ~1 |

*F — Feed
R — Raffinate
Fd — Found

Scrub of Loaded Solvent Phase

Portions of loaded solvent phase were scrubbed by intimate contact with two different $Na_2CrO_4$ solutions at pH 12 and pH 13. Test results summarized in Table 2 indicate that this scrub stage is quite feasible. The loaded solvent was contacted at an O/A ratio of 10/1, three times with fresh scrub liquor. The scrub liquor contained initially 5 g Cr/l as $Na_2CrO_4$.

TABLE 2

| Scrub Tests on Cr-loaded Adogen 464 | | | |
|---|---|---|---|
| | Scrubbed Solvent Analysis (g/l) | | |
| pH | Cr | Al | V |
| Feed* | 3.14 | 0.002 | 0.031 |
| 12 | 3.71 | <0.001 | 0.001 |
| 13 | 3.59 | 0.004 | <0.001 |

*before scrubbing

From Table 2 it is clear that Al and V were effectively removed from the solvent phase. A pH of about 12 for the scrub liquor is preferred. The purity of the loaded solvent was increased from 100 and 1500 for Cr/V and Cr/Al respectively, to 3700 for each ratio.

Chromium Recovery

The Cr-loaded solvent phase was stripped with 1 M NaCl solution at various stages and O/A ratios. The results are given in Table 3.

TABLE 3

| | | Use of NaCl for Cr Stripping - Pilot Plant Tests | | | | | | | |
|---|---|---|---|---|---|---|---|---|---|
| | | Cr (g/l) | | Al (g/l) | | V (g/l) | | | |
| No. Stages | O/A Ratio | Lded org | Stripped Strip org | Lded org | Stripped Strip org | | Lded org | Strip | Stripped org |
| 4 | 7 | 3.06 | 18.2 | 0.33 | 0.002 | <0.027 | 0.001 | 0.032 | 0.19 | <0.001 |
| 6 | 7 | 3.06 | 18.4 | 0.037 | 0.002 | <0.022 | 0.001 | 0.032 | 0.12 | 0.002 |
| 6 | 9 | 3.06 | 17.5 | 1.11 | 0.002 | <0.049 | 0.001 | 0.032 | 0.43 | 0.004 |

These data indicate that 5 or 6 stages are required and an O/A ratio of 7 can be used to give a strip liquor containing 18.4 g Cr/l. Sodium carbonate solution did not function effectively as a strip liquor.

Sodium chloride solution was tested further as stripping reagent for Cr from loaded solvent having 3.14 g Cr/l at an O/A of 25. Results are given in Table 4.

TABLE 4

| NaCl Molarity | Retention time (min.) | Strip Liquor Cr g/l |
|---|---|---|
| 1 | 1 | 16.8 |
| 2 | 1 | 31.4 |
| 5 | 1 | 66.4 |

Retention time and pH had little or no effect on Cr stripping. However, by increasing the NaCl molarity from 1 to 5, the concentration of Cr in the strip liquor was increased from 16.8 to 66.4 g Cr/l.

The stripped solvent preferably is then preequilibrated with $Na_2CO_3$ to eliminate the chloride and prepare the solvent for recycle to the extraction.

The chloride strip liquor containing Cr was evaporated to first crystallize NaCl from solution and these crystals removed. Further evaporation gave chromate crystals identified as $Na_2CrO_4.4H_2O$. The V, Al and Cl impurities in these crystals were analyzed as 0.02, 0.08 and 0.5% respectively.

Purification of V Stream

A bleed of the scrub liquor was sparged with $CO_2$ to cause precipitation of Al (and only a minor amount of V). This initial precipitate can be recycled, e.g. to the feed roast or leach steps. After removal of this precipitate further $CO_2$ was added until a pH of 8.5-9 was reached. At this point CaO was added and the slurry digested at 60° C. for 45 minutes (as in U.S. Pat. No. 2,839,359). A precipitate of $Ca(VO_3)_2$ formed and was removed. The remaining solution containing Cr and $Na_2CO_3$ at pH 12-13 can be recycled to the scrub liquor.

V Recovery

The $Ca(VO_3)_2$ precipitate was dissolved in dilute HCl and this acid solution extracted with the same amine-solvent mixture as in the co-extraction above. (At this point the solvent could be scrubbed with a vanadium solution if desired.) The organic phase was then stripped with an aqueous phase containing 10 g $NH_3$/l and 140 g $NH_4Cl$/l at an O/A ratio of 2/1. The contact time was arbitrarily 50 min. and phase separation time 2 hours. The stripping efficiency was greater than 99.5% in a single stage. A precipitate of ammonium metavanadate quickly formed in the aqueous phase. Any chromium present in the solvent phase, although stripped, did not precipitate with the vanadium. The results are shown in Table 5.

TABLE 5

| Stripping of V with $NH_3$—$NH_4Cl$ | | | |
|---|---|---|---|
| | Analyses (g/l) | | |
| | V | Cr | Al |
| Solvent Feed | 0.68 | 0.020 | <0.001 |
| Stripped Solvent | 0.004 | <0.001 | <0.001 |
| Strip Sol'n | 0.096 | 0.048 | <0.0003 |

The resultant ammonium metavanadate precipitate was dried and roasted at 690° C. for 3 hours. The V₂O₅ product analysis is given in Table 6.

TABLE 6

V₂O₅ Product

| | Analyses (%) |
|---|---|
| V | 54.49 |
| Al | 0.08 |
| Cr | 0.03 |
| Na | 0.02 |
| Cl | 0.02 |
| LOI* | 0.12 |

*Loss on ignition at 110° C.

Alternatively, the acid vanadate solution (chloride liquor) can be treated with ammonia to obtain the desired NH₃—NH₄Cl ratio and to thus precipitate ammonium metavanadate directly.

We claim:

1. A process for solvent extraction and recovery of chromium and vanadium from aqueous alkaline solutions, waste liquors or leach liquors containing said metals, comprising:
    (a) contacting the aqueous solution or liquor, at a pH of about 13 to 13.5, with an immiscible quaternary amine solvent phase, sufficient amine being utilized to cause both Cr and all of the V to be transferred to the solvent phase;
    (b) separating the loaded solvent phase from the solution or liquor and scrubbing the solvent with an aqueous chromium-containing solution to remove substantially all metals except Cr from the solvent;
    (c) recovering Cr from the scrubbed amine solvent phase by stripping with an aqueous solution and recovering Cr from the aqueous strip liquor; and
    (d) recovering V from the scrub liquor by selective precipitation and further purification.

2. The process of claim 1 wherein the amine is selected from those having the formula:

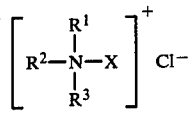

where R¹, R² and R³ are straight or branched aliphatic chains having from 8 to 10 carbon atoms, and X is lower alkyl.

3. The process of claim 1 wherein the amount of amine to co-extract both Cr and V is provided on the basis that each vol.% of amine in the organic phase will load about 0.27 g Cr+V per liter of organic phase.

4. The process of claim 1 wherein in step (a) the solvent phase is about 10 vol.% of active amine extractant, the organic to aqueous ratio O/A is about 1.2–1.3, the feed concentration is about 2.17 g Cr/liter and about 0.24 g V/liter, and all of the Cr+V is extracted.

5. The process of claim 2 wherein R¹, R² and R³ are selected from octyl, nonyl, and capryl groups and X is methyl.

6. The process of claim 1 wherein the scrub liquor in step (b) is a concentrated sodium chromate solution.

7. The process of claim 1, wherein the feed is an alkaline leach liquor obtained from an alkaline calcine of a titaniferous magnetite fraction containing Cr and V.

8. The process of claim 7 wherein a magnetic concentrate is removed from the ore and the residue is roasted before leaching.

9. The process of claim 1 wherein alkaline leach liquor fed to (a) is a caustic solution containing:
    Cr in about 3 to 8 g/l
    V in about 0.3 to 1 g/l
    and Al in about 7 to 20 g/l.

10. The process of claim 1 wherein the Cr is recovered in step (c) by stripping with a chloride solution, and selectively crystallizing.

11. The process of claim 1 wherein the V is recovered in step (d) by precipitation as Ca(VO₃)₂, reprecipitation as NH₄VO₃, and calcining the latter to V₂O₅.

12. The process of claim 1 wherein alkaline leach liquor fed to (a) also contains Al which is recovered by precipitation from at least one of the initial leach liquor, the extracted leach liquor raffinate, and the scrub liquor.

13. The process of claim 1 wherein the scrub solution in (b) is of pH about 12.

14. A process for solvent extraction and recovery of chromium and vanadium, from aqueous solutions, leach liquors or waste liquors containing said metals, comprising:
    (a) contacting the aqueous feed solution of pH 13–13.5 with an immiscible organic solvent phase containing a quaternary amine extractant, the concentration of said amine or O/A ratio being sufficiently high to effect co-extraction of substantially all Cr and V;
    (b) separating the loaded solvent phase from the aqueous phase, scrubbing the organic phase with sodium chromate solution to remove at least V, desilicating the aqueous phase then adding CO₂ to precipitate Al and roasting the precipitate to alumina;
    (c) recovering Cr from the scrubbed organic phase by stripping with sodium chloride solution and precipitating sodium chromate from the strip solution; and
    (d) recovering V from the scrub liquor by adding CO₂ to pH about 8.5–9, recovering any Al and V precipitates, then adding CaO to effect the main V precipitation as Ca(VO₃)₂, leaching the vanadium precipitates with aqueous HCl, again solvent extracting the V using the same quaternary amine system, precipitating V with NH₃ and NH₄Cl, and roasting the precipitate to V₂O₅.

* * * * *